United States Patent [19]

Fujiki et al.

[11] Patent Number: 5,288,795
[45] Date of Patent: Feb. 22, 1994

[54] MOLD-RELEASABLE CURABLE ORGANOPOLYSILOXANE COMPOSITION

[75] Inventors: Hironao Fujiki; Morio Oohasi; Mitsuaki Igarashi, Gunma, all of Japan

[73] Assignee: Shin-Etsu Chemical Co., Ltd., Tokyo, Japan

[21] Appl. No.: 807,490

[22] Filed: Dec. 16, 1991

[30] Foreign Application Priority Data

Dec. 17, 1990 [JP] Japan ............... 2-411537

[51] Int. Cl.$^5$ ............... C08K 3/36; C08K 3/22
[52] U.S. Cl. ............... 524/731; 524/861; 524/863; 524/779; 524/847
[58] Field of Search ............... 524/861, 863, 779, 731, 524/847

[56] References Cited

U.S. PATENT DOCUMENTS

| | | | |
|---|---|---|---|
| 3,574,651 | 4/1971 | Nitzsche et al. | 524/779 |
| 4,258,102 | 3/1981 | Traver et al. | 524/588 |
| 4,433,096 | 2/1984 | Bokerman et al. | 524/588 |
| 4,467,068 | 8/1984 | Maruyama et al. | 524/731 |
| 4,782,107 | 11/1988 | Lagarde | 524/779 |
| 5,028,653 | 7/1991 | Desmonceau et al. | 524/588 |
| 5,118,754 | 6/1992 | Miyakoshi et al. | 524/731 |

FOREIGN PATENT DOCUMENTS

3238039 4/1983 Fed. Rep. of Germany.
2575086 6/1986 France.

*Primary Examiner*—John C. Bleutge
*Assistant Examiner*—Karen A. Dean
*Attorney, Agent, or Firm*—Millen, White, Zelano, & Branigan

[57] ABSTRACT

A mold-releasable curable organopolysiloxane composition suitable for use as a material of a matrix mold having excellent durability of mold releasability in the preparation of replicas by resin casting is disclosed. The composition comprises, in addition to the conventional ingredients including a vinyl-containing diorganopolysiloxane, an organohydrogenpolysiloxane as a crosslinking agent of the diorganopolysiloxane, a reinforcing silica filler and a platinum compound as a catalyst, a strongly alkaline compound of an alkali metal such as potassium hydroxide, potassium siliconate, lithium siliconate and the like in a limited amount.

17 Claims, No Drawings

MOLD-RELEASABLE CURABLE ORGANOPOLYSILOXANE COMPOSITION

BACKGROUND OF THE INVENTION

The present invention relates to a mold-releasable curable organopolysiloxane composition or, more particularly, to a curable organopolysiloxane composition suitable as a material of a matrix mold having good mold-releasability for the preparation of replicas from an epoxy resin, urethane resin, plaster of paris and the like by casting into the matrix.

It is a well established technology to prepare replicas by using a matrix mold made from a cured silicon rubber into which a curable liquid resin such as epoxy resins, urethane resins and the like is cast and cured therein into a replica body. A great variety of parts in automobiles, electric appliances and others are fabricated by this technique and are under practical use. As a trend in recent years, these casting-prepared resin parts are required to be more and more upgraded in respect of performance as well as in appearance. In this regard, improvements are now under way in the properties of the casting resin while the improvements in the properties of the casting resin per se are sometimes accompanied by an adverse influence on the surface of the silicone rubber-made matrix mold greatly decreasing the durability of the mold or the number of replica pieces prepared by using a single matrix mold to cause an economical disadvantage.

With an object to improve the durability of a silicone rubber-made matrix mold used in resin casting, it is practiced that the finely divided reinforcing silica filler before compounding in the silicone rubber composition is rendered hydrophobic by the surface treatment with an organosilazane compound such as hexamethyl disilazane, octamethyl trisilazane, 1,5-di(3,3,3-trifluoropropyl)-1,1,3,3,5,5-hexamethyl trisilazane and the like. It is also known that silicone rubber-made matrix molds can be imparted with an improved tear strength when the hydrophobic treatment of the reinforcing silica filler is performed with a mixture of the above mentioned organosilazane compound and a vinyl-containing organosilazane compound such as 1,3-divinyl-1,1,3,3-tetramethyl disilazane, 3-vinyl-1,1,1,3,5,5,5-heptamethyl trisilazane, tris(trimethylsilylamino) vinyl silane, vinyl-containing poly(dimethylsilazane) and the like or the hydrophobic reinforcing silica filler is further treated with these vinyl-containing organosilazane compound.

The above mentioned method by the surface treatment of the reinforcing silica filler is indeed effective at least to some extent for increasing the durability in the mold releasability of silicone rubber-made matrix molds but is still not quite satisfactory in respect of the mold releasability with durability when the casting resin is a high-performance urethane resin or epoxy resin as in the major current of the modern resin casting technology.

SUMMARY OF THE INVENTION

The present invention accordingly has an object to provide a novel and improved curable organopolysiloxane composition capable of giving a cured silicone rubber body having mold releasability with excellent durability by dissolving the above mentioned disadvantages in the prior art compositions as well as to provide a cured silicone rubber body obtained by curing the composition.

Thus, the mold-releasable curable organopolysiloxane composition of the present invention is a uniform blend which comprises:

(a) 100 parts by weight of a diorganopolysiloxane represented by the average unit formula $$R_a SiO_{(4-a)/2}, \qquad (I)$$

in which R is an unsubstituted or substituted monovalent hydrocarbon group and the subscript a is a positive number in the range from 1.9 to 2.4, and mainly consisting of difunctional siloxane units of the formula $R_2SiO$, at least two of the groups denoted by R in a molecule being alkenyl groups;

(b) an organohydrogenpolysiloxane having, in a molecule, at least three hydrogen atoms directly bonded to the silicon atoms in an amount sufficient to provide from 0.4 to 4.0 moles of the silicon-bonded hydrogen atoms per mole of the alkenyl groups in the component (a);

(c) an alkali metal compound selected from the group consisting of alkali metal hydroxides, alkali metal oxides, alkali metal carboxylates, alkali metal alcoholates and alkali metal siliconates in an amount in the range from 5 to 5000 ppm by weight as alkali metal based on the amount of the component (a);

(d) from 5 to 50 parts by weight of a finely divided silica filler having a specific surface area of at least 50 $m^2/g$; and (e) a catalytic amount of a platinum compound.

DETAILED DESCRIPTION OF THE PREFERRED EMBODIMENTS

As is described above, the organopolysiloxane composition of the invention comprises the components (a) to (e) as the essential ingredients, of which the most characteristic is the component (c).

The base ingredient in the inventive composition is the component (a) which is a diorganopolysiloxane represented by the above given average unit formula (I), in which R denotes an unsubstituted or substituted monovalent hydrocarbon group having 1 to 10 or, preferably, 1 to 8 carbon atoms exemplified by alkyl groups such as methyl, ethyl, propyl and butyl groups, alkenyl groups such as vinyl, allyl, isopropenyl, butenyl and hexenyl groups, aryl groups such as phenyl, tolyl and xylyl groups and aralkyl groups such as benzyl and 2-phenylethyl groups as well as those substituted hydrocarbon groups obtained by replacing a part or all of the hydrogen atoms in the above named hydrocarbon groups with halogen atoms, cyano groups and the like such as chloromethyl, 3,3,3-trifluoropropyl and 2-cyanoethyl groups and the subscript a is a positive number in the range from 1.9 to 2.4. It is important that the molecules of the component (a) consist mainly of difunctional siloxane units of the formula $R_2SiO$, in which R has the same meaning as defined above, to form a linear molecular structure although a small number of trifunctional or tetrafunctional siloxane units may have no particularly adverse influences. It is essential that at least two of the groups denoted by R in a molecule are alkenyl groups or, in particular, vinyl groups in order to pertain to the curing reaction by the reaction of hydrosilation with the silicon-bonded hydrogen atoms in the component (b). All or most of the groups denoted by R other than the alkenyl groups are preferably methyl groups. It is known that introduction of 3,3,3-trifluoropropyl groups as R may have an effect to improve the solvent-resistance of the cured silicone rubber body.

The alkenyl or vinyl groups in the molecule of the component (a) can be bonded to the silicon atoms at any position within the molecule including the silicon atoms at the molecular chain ends and the silicon atoms at the intermediate positions between the terminal silicon atoms. Therefore, the diorganopolysiloxane as the component (a) is expressed by the typical general formulas shown below, denoting methyl and vinyl groups with the symbols of Me and Vi, respectively:

$ViMe_2Si$—($—O—SiMe_2—$)$_{n1}$—$SiMe_2Vi$, in which $n_1$ is a positive integer;

$ViMe_2Si$—($—O—SiMe_2—$)$_{n2}$—($—O—SiMeVi—$)$_{m1}$—$SiMe_3$, in which $m_1$ is a positive integer and $n_2$ is 0 or a positive integer;

$Me_3Si$—($—O—SiMe_2—$)$_{n2}$—($—O—SiMeVi—$)$_{m2}$—$SiMe_3$, in which $m_2$ is a positive integer of 2 or larger and $n_2$ is 0 or a positive integer; and $ViMe_2Si$—($—O—SiMe_2—$)$_{n2}$—($—O—SiMeVi—$)$_{m1}$—$SiMe_2Vi$, in which $m_1$ is a positive integer and $n_2$ is 0 or a positive integer.

It is preferable that the diorganopolysiloxane as the component (a) has such a degree of polymerization that the viscosity thereof at 25° C. is in the range from 1000 to 100,000 centipoise in view of the workability of the composition and the mechanical properties of the cured silicone rubber body obtained from the composition. When the viscosity of the component (a) is too low, the organopolysiloxane composition can hardly give a cured silicone rubber body having mechanical properties as desired. When the viscosity thereof is too high, on the other hand, the consistency of the composition after compounding of the component (a) with the other components would be so high as sometimes to cause inconvenience and troubles in the use of the composition in the preparation of a matrix mold used in resin casting.

The diorganopolysiloxane as the component (a) is a known material and can be prepared by a method well known to those skilled in the art. For example, a mixture of a cyclic dimethylpolysiloxane oligomer such as octamethyl cyclotetrasiloxane and a terminal group-providing siloxane oligomer such as hexamethyl disiloxane is subjected to the siloxane rearrangement reaction in the presence of an acidic or basic catalyst until establishment of equilibrium.

The component (b) in the inventive composition is an organohydrogenpolysiloxane which is an organopolysiloxane having, in a molecule, at least three hydrogen atoms directly bonded to the silicon atoms to serve as a crosslinking agent of the component (a) by the reaction of so-called hydrosilation between the alkenyl groups in the component (a) and the silicon-bonded hydrogen atoms therein. When the number of the silicon-bonded hydrogen atoms in a molecule is smaller than three, the organohydrogenpolysiloxane no longer serves as a crosslinking agent. The organic groups bonded to the silicon atoms in the organohydrogenpolysiloxane are exemplified by the same unsubstituted or substituted monovalent hydrocarbon groups given as the examples of the groups R in the component (a), usually, excepting alkenyl groups.

The molecular structure of the organohydrogenpolysiloxane is not particularly limitative including straightly linear, cyclic, branched and network-like ones. It is preferable that the degree of polymerization, i.e., number of silicon atoms in a molecule, of the organohydrogenpolysiloxane does not exceed 300 or, more preferably, does not exceed 200. The amount of the organohydrogenpolysiloxane as the component (b) in the inventive composition should be in such a range that from 0.4 to 4.0 moles of the silicon-bonded hydrogen atoms are provided per mole of the alkenyl groups in the component (a). When the amount of the component (b) is too small, the crosslinking density in the composition after curing would be too low so that the cured silicone rubber body would be poor in respect to the mechanical strengths and heat resistance. When the amount of the component (b) is too large, on the other hand, a drawback of foaming may sometimes occur due to the dehydrogenation reaction between the silicon-bonded hydrogen atoms in addition to the adverse influences of the heat resistance of the cured silicone rubber body.

The above described organohydrogenpolysiloxane is also a known material in the art of silicones and can be prepared by a well established process. For example, a cyclic siloxane oligomer and an oligomeric polysiloxane containing monofunctional siloxane units, of which at least either compound should have at least one silicon-bonded hydrogen atom in a molecule, are mixed together and subjected to a siloxane rearrangement reaction to equilibrium in the presence of an acidic catalyst such as sulfuric acid, trifluoromethane sulfonic acid, methane sulfonic acid and the like.

The component (c), which is the most characteristic ingredient in the inventive composition, is an strongly alkaline compound of an alkali metal. It has been unexpectedly discovered that addition of a small amount of such an alkaline compound to the composition has a great influence on the durability of the mold releasability of the cured silicone rubber body prepared from the composition. Examples of suitable alkali metal compounds include alkali metal hydroxides such as lithium hydroxide, sodium hydroxide, potassium hydroxide and cesium hydroxide, alkali metal oxides such as lithium oxide, sodium oxide and potassium oxide, alkali metal carboxylates such as lithium acetate, sodium acetate, potassium acetate, lithium octoate, sodium octoate and potassium octoate and alkali metal alcoholates such as lithium methoxide, sodium methoxide, potassium methoxide, lithium ethoxide, sodium ethoxide, potassium ethoxide, lithium propoxide, sodium propoxide, potassium propoxide as well as alkali metal siliconates expressed, for example, by the following general formula $Me_3Si$—($—O—SiMe_2—$)$_p$—$OM$, in which M is an atom of an alkali element such as Li, Na and K and the subscript p is a positive integer.

The amount of the alkali metal compound as the component (c) in the inventive composition is in the range from 5 to 5000 ppm (e.g., 30–5,000 ppm or 50–5,000 ppm) or, preferably, from 50 to 300 ppm by weight as alkali metal based on the amount of the component (a). When the amount thereof is too small, the desired effect on the durability of mold releasability cannot be fully exhibited as a matter of course. When the amount thereof is too large, on the other hand, the improvement in the durability of mold releasability is accompanied by the disadvantages that the surface of the cured silicone rubber body would lose smoothness to cause a decrease in the usefulness as a matrix mold for resin casting and the excess of the alkaline compound may act as a catalyst to promote the bond cleavage reaction of the siloxane linkages resulting in a decrease in the heat resistance of the cured silicone rubber body.

It should be noted here that the above mentioned desirable effect obtained by the addition of an alkali metal compound can also be obtained by the addition of acids such as hydrochloric acid and sulfuric acid, certain phosphorus compounds such as tetramethyl phosphonium hydroxide and tetrabutyl phosphonium hydroxide and quaternary tetraalkyl ammonium compounds such as tetramethyl ammonium hydroxide and tetrabutyl ammonium hydroxide. These compounds, however, are not suitable in practical use because the acid compounds cause a serious problem of corrosion on the apparatuses used in the preparation and curing of the composition and the phosphonium and ammonium compounds may act as a catalyst poison against the platinum catalyst as the component (e) mentioned below to cause curing inhibition of the composition.

The component (d) in the inventive composition is a finely divided silica filler which exhibits a reinforcing effect on the cured silicone rubber body of the composition. It is essential that the finely divided reinforcing silica filler as the component (d) has a specific surface area of at least 50 m$^2$/g as determined by the BET method in order to fully exhibit the reinforcing effect on the mechanical properties or, in particular, tear strength of the cured silicone rubber body of the composition because the matrix mold prepared by curing the inventive composition sometimes must involve strong reverse taper depending on the design of the replica prepared by resin casting in the matrix mold.

The amount of the silica filler as the component (d) in the inventive composition is in the range from 5 to 50 parts by weight per 100 parts by weight of the component (a). When the amount of the component (d) is too small, the desired reinforcing effect cannot be fully exhibited as a matter of course. When the amount thereof is too large, on the other hand, the composition compounded with such a large amount of the silica filler would be poorly flowable to cause troubles in the preparation of a matrix mold and the mold releasability of the matrix mold is decreased.

Various grades of hydrophilic and hydrophobic silica fillers are commercially available and can be used without particular limitations. Commercial grades of hydrophilic silica fillers include Aerosils 130, 200 and 300 sold by Nippon Aerosil Co., Cab-O-Sils MS-5 and MS-7 sold by Cabot Corp., Rheolosils QS-102 and QS-103 sold by Tokuyama Soda Co. and Nipsil LP sold by Nippon Silica Co. and commercial grades of hydrophobic silica fillers include Aerosils R-812, R-812S, R-972 and R-964 sold by DEGUSSA Co., Rheolosil MT-10 sold by Tokuyama Soda Co. and a series of Nipsil SS fillers sold by Nippon Silica Co.

The component (e) compounded in the inventive organopolysiloxane composition is a platinum compound which, as is well known in the art, serves as a catalyst to promote the reaction of hydrosilation between the alkenyl groups in the component (a) and the silicon-bonded hydrogen atoms in the component (b). Examples of suitable catalytic platinum compounds include chloroplatinic acid, alcohol-modified chloroplatinic acid and complexes of chloroplatinic acid with an olefin, aldehyde, vinyl siloxane or acetylene alcohol. Platinum black in the elementary form can also be used. The amount of the platinum compound in the inventive composition is a so-called catalytic amount to be adequately selected depending on the desired velocity of curing. The amount is usually in the range from 0.1 to 1000 ppm or, preferably, from 1 to 200 ppm by weight calculated as platinum on the base of the amount of the diorganopolysiloxane as the component (a).

Although the essential ingredients in the inventive composition are the above described components (a) to (e), it is optional that the inventive organopolysiloxane composition is further admixed with various kinds of known additives depending on the particular objects. Examples of such optional additives include curing moderators such as vinyl-containing organopolysiloxanes, e.g., 1,3,5,7-tetramethyl-1,3,5,7-tetravinyl cyclotetrasiloxane, triallyl isocyanurate, alkyl maleates, acetylene alcohols unmodified or modified with an organosilane or organopolysiloxane, hydroperoxides, tetramethyl ethylenediamine and benzotriazole which can be used either singly or as a combination of two kinds or more according to need, coloring agents, i.e., dyes and inorganic pigments, such as cobalt blue and the like and heat-resistance and flame-retardancy improvers such as ceric oxide, zinc carbonate, manganese carbonate, iron oxide, titanium dioxide, carbon black and the like each in a limited amount. In particular, the mechanical strength of the cured silicone rubber body obtained from the inventive composition can be improved by the addition of a so-called MQ resin basically consisting of monofunctional siloxane units and tetrafunctional siloxane units and having vinyl groups and compatibility with the diorganopolysiloxane.

The organopolysiloxane composition of the invention can be readily prepared by uniformly blending the above described essential and optional ingredients each in a specified amount by using a suitable blending machine. The thus prepared inventive composition can be cured by heating, for example, at a temperature in the range up to 150° C. for 30 minutes to 3 days or, usually, at temperature in the range from room temperature to 100° C. for 1 to 48 hours, to give a cured silicone rubber body having excellently durable mold releasability suitable for use as a matrix of replica molding with epoxy resins, urethane resins and the like. When the cured silicone rubber body of the inventive composition is used as a matrix in the preparation of replicas by the techniques of resin casting, the durability of mold releasability of the surface can be further enhanced by coating the surface with a silicone oil or a fluorocarbon oil or a mold-release agent capable of forming a coating film containing these oils.

In the following, examples and comparative examples are given to more fully illustrate the curable organopolysiloxane composition of the invention.

EXAMPLES 1 TO 5 AND COMPARATIVE EXAMPLES 1 TO 3.

In Example 1, 800 g of a dimethylpolysiloxane having a viscosity of about 5000 centipoise at 25° C. and terminated at each molecular chain end with a vinyl dimethyl silyl group and 200 g of a finely divided silica filler having a specific surface area of 200 m$^2$/g as determined by the BET method (Aerosil 200, supra) together with potassium hydroxide in an amount of 30 ppm by weight as potassium based on the amount of the dimethylpolysiloxane, 80 g of hexamethyl disilazane and 10 g of water as a hydrolyzing agent for the silazane compound were introduced into a kneader and they were thoroughly kneaded together at room temperature for 1 hour followed by elevation of the temperature up to 150° C. to continue kneading for 2 hours at this temperature and cooling of the thus prepared base compound to room temperature.

A 500 g portion of the thus prepared base compound was then admixed and thoroughly kneaded with 25 g of a methyl hydrogen polysiloxane expressed by the formula

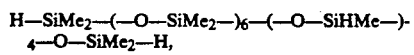

in which Me is a methyl group, and an octyl alcohol complex of chloroplatinic acid in an amount of 100 ppm by weight as platinum based on the amount of the dimethyl polysiloxane followed by deaeration under reduced pressure to give a curable organopolysiloxane composition, referred to as the Composition I hereinbelow, having a viscosity of 550 poise at 25° C.

Another curable organopolysiloxane composition, referred to as the Composition II hereinbelow, having a viscosity of 1300 poise at 25° C. was prepared in Example 2 in the same formulation and in the same manner as in the preparation of the Composition I excepting an increase of the amount of potassium hydroxide to 150 ppm by weight based on the dimethyl polysiloxane.

A further curable organopolysiloxane composition, referred to as the Composition III hereinbelow, having a viscosity of 800 poise at 25° C. was prepared in Example 3 in the same formulation and in the same manner as in the preparation of the Composition I excepting replacement of Aerosil 200 with the same amount of a hydrophobic finely divided silica filler having a specific surface area of 230 m²/g (Aerosil R-812, supra).

A fourth curable organopolysiloxane composition, referred to as the Composition IV hereinbelow, having a viscosity of 400 poise at 25° C. was prepared in Example 4 in the same formulation and in the same manner as in the preparation of the Composition III excepting omission of 80 g of the hexamethyl disilazane and 10 g of water.

A fifth curable organopolysiloxane composition, referred to as the Composition V hereinbelow, having a viscosity of 500 poise at 25° C. was prepared in Example 5 in the same formulation and in the same manner as in the preparation of the Composition IV excepting replacement of Aerosil R-812 with the same amount of another hydrophobic finely divided silica filler having a specific surface area of 160 m²/g (Aerosil R-974, supra).

In Comparative Example 1 undertaken for comparison, a curable organopolysiloxane composition, referred to as the Composition VI hereinbelow, having a viscosity of 400 poise at 25° C. was prepared in the same formulation and in the same manner as in the preparation of the Composition I excepting omission of the potassium hydroxide.

For further comparison, another curable organopolysiloxane composition, referred to as the Composition VII hereinbelow, having a viscosity of 350 poise at 25° C. was prepared in Comparative Example 2 in the same formulation and in the same manner as in the preparation of the Composition VI excepting replacement of Aerosil 200 with the same amount of the hydrophobic silica filler Aerosil R-812.

A third comparative curable organopolysiloxane composition, referred to as the Composition VIII hereinbelow, having a viscosity of 1200 poise at 25° C. was prepared in Comparative Example 3 in the same formulation and in the same manner as in the preparation of the Composition VII excepting further omission of 80 g of hexamethyl disilazane and 10 g of water.

Each of the above prepared Compositions I to VIII was shaped into a sheet of 2 mm thickness and cured by heating at 60° C for 2 hours to give a test speciment according to JIS K 6301, of which mechanical properties were measured to give the results shown in Table 1. Separately, a concave mold as a matrix for resin casting was prepared from each of the Compositions I to VIII. A urethanebased casting resin (Grade 3075, a product by H & K Co.) was cast to fill the cavity of the concave matrix mold and cured therein by heating at 60° C. for 1 hour to give a replica of the cured urethane resin of which the surface gloss in % as the intensity ratio of the reflection to the incident light was measured. This procedure of replica preparation was repeated up to 20 times by using one and the same matrix mold and measurement of the surface gloss was conducted for the replicas obtained in the 1st, 5th, 10th, 15th and 20th times of casting to give the results of the surface gloss in % shown in Table 1.

EXAMPLES 6 TO 8.

In Example 6,200 g of the same dimethyl polysiloxane terminated with vinyl dimethyl silyl groups at the molecular chain ends as used in Example 1 and 200 g of Aerosil 200 were introduced into a kneader together with 80 g of hexamethyl disilazane and 10 g of water and they were thoroughly kneaded together for 1 hour at room temperature followed by elevation of the temperature up to 150° C. to continue kneading of the mixture for 2 hours at this temperature followed by cooling to room temperature to give a base compound.

A 500 g portion of this base compound was admixed and kneaded together with 25 g of the same methyl hydrogen polysiloxane as used in Example 1, potassium siliconate in an amount of 150 ppm by weight as potassium based on the amount of the dimethyl polysiloxane and the same octyl alcohol complex of chloroplatinic acid as used in Example 1 in an amount of 100 ppm by weight as platinum based on the amount of the dimethyl polysiloxane followed by deaeration under reduced pressure to give a curable organopolysiloxane composition having a viscosity of 880 poise at 25° C., which is referred to as the Composition IX hereinbelow.

Two more curable organopolysiloxane compositions, referred to as the Compositions X and XI, having viscosities of 750 and 800 poise at 25° C., respectively, were prepared in Examples 7 and 8, respectively, in the same formulation and in the same manner as in the preparation of the Composition IX except that the amount of the potassium siliconate in Example 7 was decreased to 100 ppm by weight as potassium based on the amount of the dimethyl polysiloxane and that the potassium siliconate was replaced with lithium siliconate in an amount of 50 ppm by weight as lithium based on the amount of the dimethyl polysiloxane.

Each of these three Compositions IX to XI was subjected to the same tests as in the preceding examples to give the results shown in Table 1.

TABLE 1

| | Composition No. | | | | | | | | | | |
|---|---|---|---|---|---|---|---|---|---|---|---|
| | I | II | III | IV | V | VI | VII | VIII | IX | X | XI |
| Hardness, JIS A | 41 | 42 | 41 | 43 | 33 | 35 | 35 | 40 | 37 | 38 | 37 |
| Ultimate elongation, % | 300 | 290 | 290 | 290 | 300 | 400 | 350 | 420 | 330 | 290 | 320 |
| Tensile strength, kgf/cm$^2$ | 75 | 57 | 55 | 61 | 50 | 55 | 58 | 65 | 50 | 45 | 55 |
| Tear strength, kgf/cm | 15 | 15 | 14 | 17 | 13 | 25 | 12 | 28 | 38 | 22 | 24 |
| Surface gloss, %, of urethane resin replica | | | | | | | | | | | |
| 1st time | 99 | 90 | 91 | 90 | 90 | 95 | 90 | 93 | 89 | 90 | 82 |
| 5th time | 85 | 90 | 89 | 93 | 91 | 95 | 85 | 90 | 85 | 83 | 83 |
| 10th time | 88 | 91 | 95 | 90 | 85 | 55 | 70 | 77 | 83 | 82 | 78 |
| 15th time | 65 | 75 | 92 | 89 | 74 | 30 | 55 | 60 | 75 | 70 | 85 |
| 20th time | 55 | 68 | 87 | 90 | 68 | 21 | 15 | 35 | 80 | 71 | 73 |

What is claimed is:

1. A mold-releasable curable organopolysiloxane composition which comprises, as a blend:
   (a) 100 parts by weight of a diorganopolysiloxane represented by the average unit formula $$R_aSiO_{(4-a)/2},$$

in which R is an unsubstituted or substituted monovalent hydrocarbon group and the subscript a is a positive number 1.9 to 2.4, and mainly consisting of difunctional siloxane units of the formula $R_2SiO$, at least two of the groups denoted by R per molecule being alkenyl groups;
   (b) an organohydrogenpolysiloxane having, in a molecule, at least three hydrogen atoms directly bonded to the silicon atoms, in an amount sufficient to provide from 0.4 to 4.0 moles of the silicon-bonded hydrogen atoms per mole of the alkenyl groups in the component (a);
   (c) an alkali metal compound selected from the group consisting of alkali metal hydroxides, alkali metal oxides, alkali metal carboxylates, alkali metal alcoholates and alkali metal siliconates, in an amount of 5 to 5000 ppm by weight as alkali metal based on the amount of the component (a);
   (d) 5 to 50 parts by weight of a finely divided silica filler having a specific surface area of at least 50 m$^2$/g; and
   (e) a catalytic amount of a platinum compound.

2. A mold-releasable curable organopolysiloxane composition as claimed in claim 1, in which the alkenyl group in the component (a) is a vinyl group.

3. A mold-releasable curable organopolysiloxane composition as claimed in claim 1, in which the diorganopolysiloxane as the component (a) has a viscosity of 1000 to 100,000 centipoise at 25° C.

4. A mold-releasable curable organopolysiloxane composition as claimed in claim 1, in which the organohydrogenpolysiloxane as the component (b) has a degree of polymerization not exceeding 300.

5. A mold-releasable curable organopolysiloxane composition as claimed in claim 1, in which the amount of the platinum compound as the component (e) is 0.1 to 1000 ppm by weight as platinum based on the amount of the diorganopolysiloxane as the component (a).

6. A cured silicone rubber body obtained by curing the mold-releasable curable organopolysiloxane composition according to claim 1.

7. A composition according to claim 1, wherein the amount of component (c) is 30–5,000 ppm by weight as alkali metal based on the amount of component (a).

8. A composition according to claim 1, wherein the amount of component (c) is 50–5,000 ppm by weight as alkali metal based on the amount of component (a).

9. A composition according to claim 1, wherein the amount of component (c) is 50–300 ppm by weight as alkali metal based on the amount of component (a).

10. A composition according to claim 1, wherein component (b) has a degree of polymerization not exceeding 200.

11. A composition according to claim 1, wherein group R in component (a) is, in each case, alkyl of up to 10 C. atoms, alkenyl of up to 10 C atoms, aryl of up to 10 C atoms, or aralkyl of up to 10 C atoms.

12. A composition according to claim 1, wherein group R in component (a) is, in each case, methyl, ethyl, propyl, butyl, vinyl, allyl, isopropenyl, butenyl, hexenyl, phenyl, tolyl, xylyl, benzyl, 2-phenylethyl, chloromethyl, 3,3,3-trifluoropropyl or 2-cyanoethyl.

13. A composition according to claim 1, wherein the diorganopolysiloxane of component (a) is of the formula $$ViMe_2Si-(-O-SiMe_2-)_{n1}-SiMe_2Vi,$$

$$ViMe_2Si-(-O-SiMe_2-)_{n2}-(-O-SiMeVi-)_{m1}-SiMe_3,$$

$$Me_3Si-(-O-SiMe_2-)_{n2}-(-O-SiMeVi-)_{m2}-SiMe_3, \text{ or}$$

$$ViMe_2Si-(-O-SiMe_2-)_{n2}-(-O-SiMeVi-)_{m1}-SiMe_2Vi$$

wherein
Me is methyl,
Vi is vinyl,
$n_1$ is a positive integer,
$m_1$ is a positive integer,
$n_2$ is 0 or a positive integer, and
$m_2$ is a positive integer of 2 or larger.

14. A composition according to claim 1, wherein the organic groups bonded to silicon atoms in the organohydrogenpolysiloxane of component (b) are alkyl of up to 10 C atoms, aryl of up to 10 C atoms, or aralkyl of up to 10 C atoms.

15. A composition according to claim 1, wherein said alkali metal compound of component (c) is potassium hydroxide or potassium siliconate.

16. A process for the production of a cured silicone rubber comprising:
   (i) uniformly blending together:
      (a) 100 parts by weight of a diorganopolysiloxane represented by the average unit formula $$R_aSiO_{(4-a)/2},$$

in which R is an unsubstituted or substituted monovalent hydrocarbon group and the subscript a is a positive number 1.9 to 2.4, at least two of the groups denoted by R per molecule being alkenyl groups, and said diorganopolysiloxane having a linear molecular structure;

(b) an organohydrogenpolysiloxane having, in a molecule, at least three hydrogen atoms directly bonded to silicon atoms, in an amount sufficient to provide 0.4 to 4.0 moles of the silicone-bonded hydrogen atoms per mole of the alkenyl groups in component (a);

(c) an alkali metal compound selected from the group consisting of alkali metal hydroxides, alkali metal oxides, alkali metal carboxylates, alkali metal alcoholates and alkali metal siliconates, in an amount of 5 to 5,000 ppm by weight as alkali metal based on the amount of component (a);

(d) 5 to 50 parts by weight of a finely divided silica filler having a specific surface area of at least 50 m$^2$/g; and (e) a catalytic amount of a platinum compound; and (ii) curing the resultant composition at room temperature to 150° C. for 30 minutes to 3 days.

17. A mold-releasable curable organopolysiloxane composition which comprises, as a blend:

(a) 100 parts by weight of a diorganopolysiloxane represented by the average unit formula $$R_aSiO_{(4-1)/2},$$

in which R is an unsubstituted or substituted monovalent hydrocarbon group and the subscript a is a positive number 1.9 to 2.4, at least two of the groups denoted by R per molecule being alkenyl groups, and said diorganopolysiloxane having a linear molecular structure;

(b) an organohydrogenpolysiloxane having, in a molecule, at least three hydrogen atoms directly bonded to silicon atoms, in an amount sufficient to provide 0.4 to 4.0 moles of the silicon-bonded hydrogen atoms per mole of the alkenyl groups in component (a);

(c) an alkali metal compound selected from the group consisting of alkali metal hydroxides, alkali metal oxides, alkali metal carboxylates, alkali metal alcoholates and alkali metal siliconates, in an amount of 5 to 5,000 ppm by weight as alkali metal based on the amount of component (a);

(d) 5 to 50 parts by weight of a finely divided silica filler having a specific surface area of at least 50 m$^2$/g; and (e) a catalytic amount of a platinum compound.

* * * * *